US00RE34409E

United States Patent [19]

Hakamata et al.

[11] E Patent Number: Re. 34,409

[45] Reissued Date of Patent: Oct. 19, 1993

[54] DRIVE CIRCUIT FOR SURFACE-WAVE DRIVEN MOTOR UTILIZING ULTRASONIC VIBRATION

[75] Inventors: Kazuo Hakamata, Kawasaki; Tadao Takagi, Yokohama; Yukio Hyodo, Hiratsuka, all of Japan

[73] Assignee: Nikon Corporation, Tokyo, Japan

[21] Appl. No.: 759,958

[22] Filed: Sep. 17, 1991

Related U.S. Patent Documents

Reissue of:

[64] Patent No.: 4,510,411
Issued: Apr. 9, 1985
Appl. No.: 605,693
Filed: Apr. 30, 1984

U.S. Applications:

[63] Continuation of Ser. No. 83,443, Aug. 10, 1987, abandoned.

[30] Foreign Application Priority Data

May 4, 1983 [JP] Japan ..... 58-77380

[51] Int. Cl.[5] ..... H01L 41/08

[52] U.S. Cl. ..... 310/316; 310/323; 310/328

[58] Field of Search ..... 318/116-118; 310/322, 323, 328, 26, 316, 317

[56] References Cited

U.S. PATENT DOCUMENTS

| | | | |
|---|---|---|---|
| 3,673,474 | 9/1972 | White et al. | 318/116 |
| 3,967,143 | 3/1976 | Watanabe et al. | 310/8.1 |
| 4,019,073 | 6/1977 | Vishnevsky et al. | 310/323 |
| 4,240,141 | 5/1980 | Vasiliev et al. | 318/114 |
| 4,400,641 | 3/1983 | Vishnevsky et al. | 310/323 |
| 4,453,103 | 4/1984 | Vishnevsky et al. | 310/323 |
| 4,468,583 | 6/1984 | Mori | 310/328 |
| 4,471,257 | 6/1984 | Kleinschmidt | 310/328 |
| 4,484,099 | 6/1984 | Kawai et al. | 310/317 |
| 4,495,432 | 1/1985 | Katsuma et al. | 310/328 |
| 4,504,760 | 11/1985 | Yamamoto et al. | 310/323 |
| 4,513,219 | 2/1985 | Katsuma et al. | 310/328 |
| 4,562,374 | 1/1985 | Sashida | 310/328 |

FOREIGN PATENT DOCUMENTS

| | | |
|---|---|---|
| 197709 | 1/1974 | U.S.S.R. . |
| 399036 | 2/1978 | U.S.S.R. . |
| 595813 | 12/1979 | U.S.S.R. . |
| 612357 | 5/1980 | U.S.S.R. . |
| 646395 | 6/1983 | U.S.S.R. . |
| 651434 | 6/1983 | U.S.S.R. . |
| 658684 | 2/1985 | U.S.S.R. . |
| 670992 | 3/1986 | U.S.S.R. . |
| 1323196 | 7/1971 | United Kingdom . |
| 2044015 | 2/1979 | United Kingdom . |
| 2044014 | 3/1979 | United Kingdom . |
| 2044013 | 4/1979 | United Kingdom . |
| 2088645 | 2/1981 | United Kingdom . |

OTHER PUBLICATIONS

IBM Technical Disclosure Bulletin, "Ultrasonic Driven Motor", Dec. 1973, vol. 16, No. 7, p. 2263.

Elementary Application of Ultrasonic (Electronic Science Series No. 7, published Nov. 25, 1972) with partial English translation.

A Technical Guide Book of Ultrasonic, published Jul. 20, 1978 with partial English translation.

Drafts for Lectures to 3rd Symposium on Elementary Knowledge and Application of Ultrasonic Electronics, published Dec. 9, 1982 with partial English translation.

*Primary Examiner*—Mark O. Budd

*Attorney, Agent, or Firm*—Shapiro and Shapiro

[57] ABSTRACT

A surface-wave driven motor comprises a moving member for being displaced, a resilient member having a surface urged against the moving member, a piezo-electric member provided in contact with the resilient member to impart vibration to the resilient member and create an elastic wave in the surface, means having electrode means provided on the piezo-electric member and applying an AC voltage to the piezo-electric member through the electrode means, means for detecting an electrical output produced in the piezo-electric member from an area on the piezo-electric member which is electrically insulated from the electrode means, and means for determining the frequency of the AC voltage on the basis of the detected electrical output.

27 Claims, 2 Drawing Sheets

DRIVE CIRCUIT FOR SURFACE-WAVE DRIVEN MOTOR UTILIZING ULTRASONIC VIBRATION

Matter enclosed in heavy brackets [ ] appears in the original patent but forms no part of this reissue specification; matter printed in italics indicates the additions made by reissue.

*This is a continuation of reissue application Ser. No. 083,443 filed Aug. 10, 1987, now abandoned.*

BACKGROUND OF THE INVENTION

1. Field of the Invention

This invention relates to a surface-wave driven motor for driving a moving member by an elastic wave of a high frequency.

2. Description of the Prior Art

Any of electric motors heretofore used most generally utilizes an electromagnetic force and therefore has great limitations in shape and materials. Also, they-use a winding constituting an electromagnet and use a permanent magnet of rare earth to obtain a high output, and this has also led to a limitation in cost.

For such a situation, in recent years, actuators have been developed to replace electromagnetic type motors, and as one of them, an ultrasonic driven motor utilizing an ultrasonic wave has been conceived. This ultrasonic driven motor is regarded as being much more advantageous than the conventional motors in shape, efficiency, cost, etc. and as a basic research report thereof, IBM Technical Disclosure Bulletin Vol. 16, No. 7, etc. have been published from IBM, Inc., U.S.A. As an example of the trial manufacture of this ultrasonic driven motor, a surface-wave type ultrasonic driven motor (hereinafter referred to the surface-wave driven motor) in which a piezo-electric element or the like is used to create a surface wave on the surface of a resilient member and drive a rotor urged against this surface has been devised and already announced.

SUMMARY OF THE INVENTION

It is an object of the present invention to realize a surface-wave driven motor which utilizes an elastic wave of a high frequency to displace a moving member.

The surface-wave driven motor of the present invention is provided with a resilient member urged against a moving member, and an electrostrictive device to which an AC voltage is applied to excite the resilient member, and is characterized in that a voltage created by the excitation is detected from an area of the electrostrictive device to which the AC voltage is not applied and the optimum frequency of the AC voltage to be applied is determined on the basis of the detected voltage.

According to a preferred embodiment of the present invention applied to a rotary motor for rotatively displacing a moving member, the electrostrictive device comprises a piezo-electric member formed into a ring-like shape coaxial with a rotor and the piezo-electric member is alternately subjected to polarization treatment so that it has opposite polarities at predetermined intervals in the circumferential direction thereof. This predetermined length is preferably set to ½ of the bending vibration wavelength of the resilient member. An AC voltage is applied to most of the surface area of the piezo-electric member except an area thereof. An output terminal for extracting an alternating current appearing in response to the bending vibration of the piezo-electric member is connected to the remaining area of the piezo-electric member.

The invention will become more fully apparent from the following detailed description thereof taken in conjunction with the accompanying drawings.

DESCRIPTION OF THE PREFERRED EMBODIMENTS

The principle of driving of the surface-wave driven motor according to the present invention will hereinafter be described.

Figure 1:
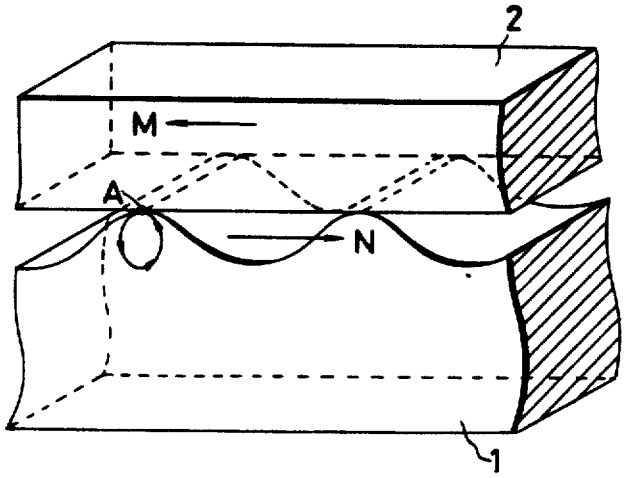
FIG. 1 is a view for illustrating the principle of driving of a surface-wave driven motor.
Figure 2:
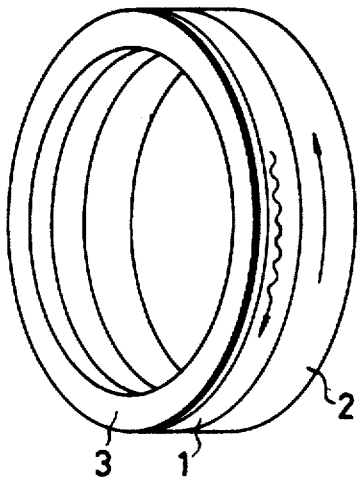
FIG. 2 is a perspective view showing the fundamental structure of the surface-wave driven motor.

When vibration is imparted to the surface of a resilient member by the use of an electrostrictive device there is created a surface wave propagated through the surface of the resilient member. In FIG. 1, paying attention to a point A on the surface of an resilient member 1, the point A depicts an elliptical locus. As a result, a moving member 2 is driven in the opposite direction (arrow M) to the direction of travel (arrow N) of the surface wave by the friction force between it and the resilient member 1. Accordingly, by forming each of these elements into an annular shape, there is obtained a rotary drive source. That is, when vibration is imparted to the resilient member 1 formed in an annular shape as shown in FIG. 2 by the use of an electrostrictive device 3 formed by annular ceramics or the like, there is created in the surface of the resilient member a surface wave propagated along the annulus and the moving member 2 is rotated.

A preferred embodiment of the surface-wave driven motor according to the present invention which utilizes such a principle will hereinafter be described.

Figure 3A:
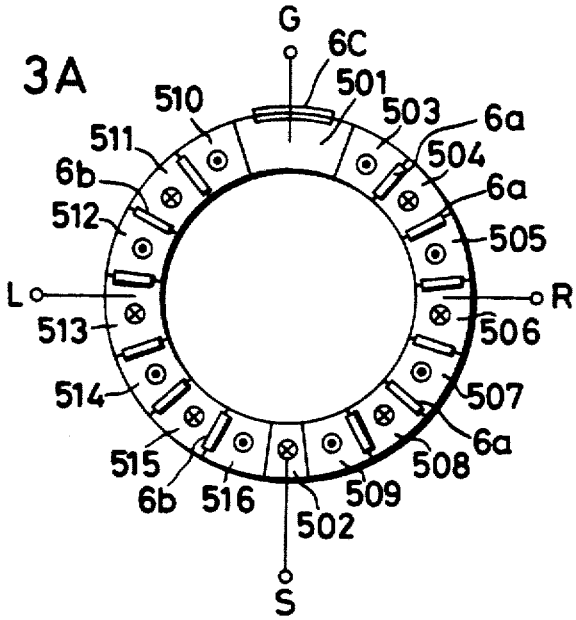
FIGS. 3A and 3B are a plan view and a front view, respectively of a surface-wave driven motor according to an embodiment of the present invention.
Figure 3B:
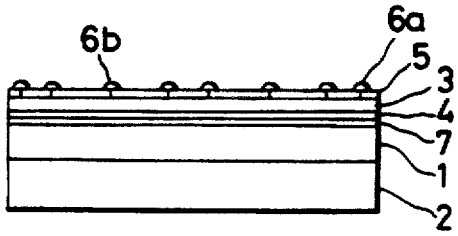

Referring to FIGS. 3A and 3B, a ring-like piezo-electric member 3 constituting an electrostrictive device is formed of PZT (zirconic acid titanic acid lead) or the like. The whole of one surface of the piezo-electric member 3 is coated with a ring-like electrode 4 consisting of silver or the like. The other surface of the piezo-electric member 3 is coated with a segment electrode group 5 consisting of silver or the like. The segment electrode group 5 comprises sixteen segment electrodes 501–506. The segment electrode 501 has a length of $\frac{3}{4}\lambda$ (in the present specification, $\lambda$ is the bending vibration wavelength) in the circumferential direction, and the segment electrode 502 has a length of $\frac{1}{4}\lambda$ in the circumferential direction and is 180° out of phase with the segment electrode 501. The segment electrodes 503–509 each have a length of $\lambda/2$ in the circumferential direction and lie on one side between the segment electrodes 501 and 502. On the other hand, the segment electrodes 510–516 each have a length of $\lambda/2$ in the circumferential direction and lie on the other side between the electrodes 501 and 502.

The areas of the piezo-electric member 3 in which the segment electrodes 503–509 and 510–516 each having the length of $\lambda/2$ are opposed to each other are polarized so that they differ in direction of polarization from the adjacent area. For example, in the piezo-electric member 3, the area with which the segment electrode 503 is in contact and the area with which the segment electrode 504 is in contact are opposite in direction of polarization to each other. In FIG. 3A, marks · and ⊕ show that the segment electrodes are opposite in direction of polarization. The segment electrodes 503–509 each having the length of $\lambda/2$ are electrodes to which a driving alternating current is to be applied and are connected to one another by electrically conductive past 6a, and an input AC voltage is applied to these electrodes from an input terminal R. The segment electrodes 510–516 also are electrodes to which a driving alternating current is to be applied and are likewise connected to one another by paste 6b, and an input AC voltage is applied to these electrodes from an input terminal L. The segment electrode 501 having the length of $\frac{3}{4}\lambda$ is connected to a ring electrode 4 on the back side of the piezo-electric member 3 by electrically conductive paste 6c provided at the end of the outer periphery of the piezo-electric member 3. A ground potential is applied to the segment electrode 501 from a grounded terminal G. That is, this segment electrode 501 merely serves as the leadout electrode of the ring electrode 4. The segment electrode 502 is insulated from both of other electrodes 509, 516 adjacent thereto and the ring electrode 4, and does not cooperate with the input AC voltages from the terminals R and L. this segment electrode 502 is provided with an output terminal S, and the area of the piezo-electric member 3 which is opposed to the electrode 502 is polarization-treated. The ring-like piezo-electric member 3 has the ring-like resilient member 1 of brass or the like secured to the side thereof which is adjacent to the ring electrode 4 by an adhesive agent 7. The rotor 2 bears against the resilient member 1 with a certain contact pressure.

When AC voltages of a predetermined frequency which are 90° out of phase with each other are applied between the input terminals R and G and between the input terminals L and G, bending vibration of wavelength $\lambda$ is created in the piezo-electric member 3 and the resilient member 1 and the rotor 2 is rotated. To enhance the efficiency of this motor, it is necessary to keep the frequency of said AC voltages at an optimum value. However, this optimum value is variable by extraneous conditions such as the contact pressure between the rotor 2 and the resilient member 1 and the temperature of the motor. Accordingly, if the frequency of said AC voltages is always kept at a predetermined value, there cannot be obtained a surface-wave driven motor of high efficiency.

Therefore, in the present embodiment, provision is made of specific means as described hereinafter which utilizes the output from the terminal S to maintain the frequency of the input power source always at an optimum value conforming to the extraneous conditions.

The segment electrode 502 to which the terminal S is connected is an electrode to which the input AC voltage is not applied and, when the motor is driven and bending vibration is created in the piezo-electric member 3, an alternating current corresponding to this bending vibration appears in the segment electrode 502. This phenomenon is due to the property of the piezo-electric member which creates vibration if an alternating current is applied thereto and which creates an AC output if vibration is imparted thereto.

Figure 4:
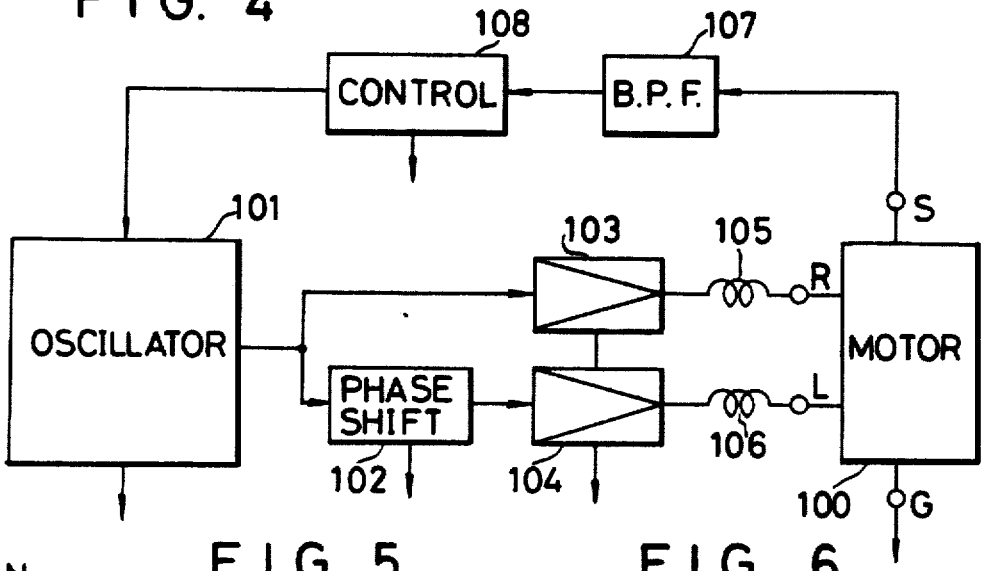
FIG. 4 is a circuit diagram showing an example of the rotation control device for the motor of FIG. 3A.

The AC output from the terminal S is applied as an input to a rotation control device shown in FIG. 4. The rotation control device comprises a controllable oscillator 101, a 90° phase shifter 102, amplifiers 103, 104, inductances 105, 106, a band-pass filter 107 and an oscillation controller 108. A sine wave of a certain frequency is put out from the oscillator 101 and applied as an input to the amplifier 103 and the phase shifter 102. The output of the phase shifter 102 is applied as an input to the amplifier 104. The amplifiers 103 and 104 apply AC voltages 90° out of phase with each other to the surface-wave driven motor 100 from the terminals R and L through the inductances 105 and 106. The state of revolution of the surface-wave driven motor is put out in the form of a magnitude of AC voltage from the terminal S connected to the segment electrode 502 and is applied as an input to the band-pass filter 107. Any unnecessary signal is removed by the band-pass filter 107 and only a signal necessary for controlling the revolution is applied as an input to the oscillation controller 108 and fed back to the controllable oscillator 101.

Figure 5:
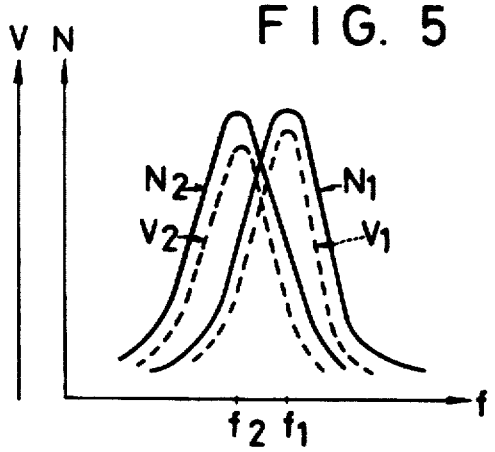
FIG. 5 is a characteristic curve graph showing the relation of the number of revolutions of the motor and the detected voltage to the input frequency to the surface-wave driven motor under different extraneous conditions.

FIG. 5 is a characteristic curve graph showing the relation when the number of revolutions of the surface-wave driven motor is N for the input frequency f and the voltage (for example, the actually effective value) detected from the terminal S of the segment electrode 502 for detecting the vibration of the surface-wave driven motor at that time is V. In FIG. 5, the characteristic of the number of revolutions of the motor and the characteristic of the detected voltage for the input frequency under certain extraneous conditions are as indicated by $N_1$ and $V_1$, respectively, and both of them become maximum at an optimum input frequency $f_1$. Also, when the extraneous conditions have changed, the characteristic of the number of revolutions of the motor and the characteristic of the detected voltage for the input frequency are as indicated by $N_2$ and $V_2$, respectively, and at this time, $N_2$ and $V_2$ are maximum for the optimum input frequency $f_2$. In this manner, it has been empirically found that under certain extraneous conditions, the frequency which gives a peak to the number of revolutions N of the motor and the frequency which gives a peak to the detected voltage V are substantially coincident with each other. If, in spite of a change in the extraneous conditions, the input frequency is still maintained, for example, at $f_1$, both the number of revolutions N of the motor and the detected voltage V will be greatly reduced. So, the rotation control device of FIG. 4 is designed such that the oscillation controller 108 controls the oscillator 101 in accordance with the voltage detected from the terminal S of the segment electrode 502 of the surface-wave driven motor and always controls the oscillation frequency i.e., the input frequency to the surface-wave driven motor, at the optimum value (e.g. $f_2$) of the then extraneous conditions. Thus, even if the resonance frequency between the ring-like piezo-electric member and the resilient member in the surface-wave driven motor is varied under the influence of disturbance, an optimum frequency is always put out from the oscillator 101 and accordingly, the revolution of the surface-wave driven motor is maintained optimum.

Figure 6:
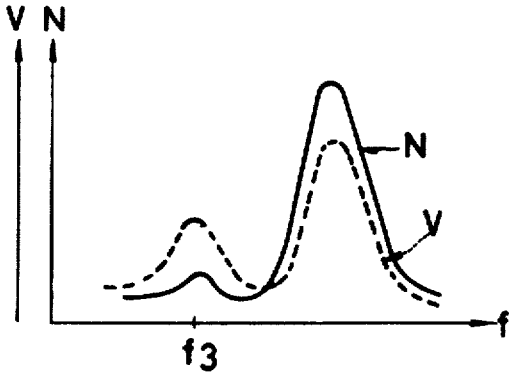
FIG. 6 is a graph showing a case where a plurality of peaks appear in the characteristic curve showing the relation of the number of revolutions of the motor and the detected voltage to the input frequency.

On the other hand, in some cases, the voltage V detected from the terminal S connected to the segment electrode 502 of the surface-wave driven motor, as previously described, assumes a maximum value at the input frequency to the motor which provides the maximum value of the number of revolutions N of the motor and, as shown in FIG. 6, presents a small peak at a frequency $f_3$ considerably distant therefrom. To hamper the adverse effect of this frequency $f_3$, the band-pass filter 107 passes therethrough a frequency band which provides the maximum value of the number of revolutions N of the motor, for example, the vicinity of the frequencies $f_1$-$f_2$ of FIG. 5, and cuts the other frequency bands including the above-mentioned frequency $f_3$.

If, as in the above-described embodiment, the resilient member is formed into a ring-like shape, the resonance frequency thereof differs in the inside and the outside of the ring. Also, the surface wave which drives the rotor concentrates on the outside of the ring. Accordingly, a monitor voltage introduced into the rotation control device should desirably be one which has detected the vibration of the outer periphery of the ring of the piezo-electric member. Thus, by coating only the outer peripheral portion of the ring-like piezo-electric member with a vibration detecting segment electrode, vibration in the outer peripheral portion of the ring-like piezo-electric member can be detected.

Figure 7:
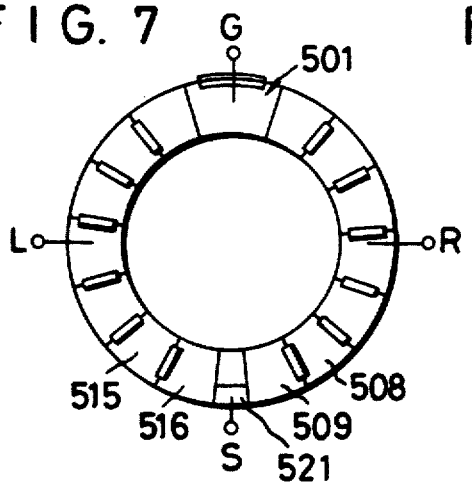
FIG. 7 is a plan view showing another embodiment of the surface-wave driven motor according to the present invention.

In the embodiment shown in FIG. 7, an electrically insulated segment electrode 521 is formed in the outer periphery of an area on the piezo-electric member between segment electrodes 509 and 516 which has a length of $\frac{1}{4}\lambda$ in the circumferential direction, and a monitor voltage detecting output terminal S is connected to this segment electrode 521.

Figure 8:
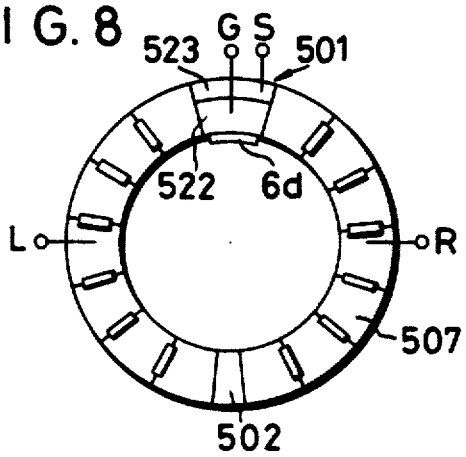
FIG. 8 is a plan view showing still another embodiment of the surface-wave driven motor according to the present invention.

Also, as a monitor voltage detecting electrode, for example, an electrode 501 is divided radially to form two mutually insulated electrodes 522 and 523 as shown in FIG. 8, and the inner electrode 522 is connected to the ring-like electrode 4 by electrically conductive paste 6d and also connected to the grounded terminal G so that it may be used as the lead-out electrode of the ring-like electrode, and the terminal S is connected to the outer electrode 523 so that this electrode may be used as a vibration detecting electrode. Likewise, any of segment electrodes 503–509 and 510–516, for example, electrode 507, can be divided to form a driving AC applying electrode and a vibration detecting electrode.

As a modification of the present invention, it is also possible to insulate, for example, a small portion of the ring-like electrode 2 from the remainder thereof and use this small portion as a vibration detecting electrode and on the other hand, insulate the portion of the segment electrode group 5 which is opposed to the vibration detecting electrode with the piezo-electric member 3 interposed therebetween from the other portion and use this portion as the opposed electrode of the vibration detecting electrode and take out a vibration detection signal from the vibration detecting electrode and the opposed electrode. Of course, this opposed electrode may be one which corresponds to the segment electrode 501 or 502 to which the AC voltage is not applied.

In the above-described example, the vibration detecting electrode and the opposed electrode which are opposed to each other with the piezo-electric member interposed therebetween are used as a pair of electrodes for detecting vibration, but this pair of electrodes may both be provided on the side of the ring-like electrode 4 or on the side of the segment electrode group 5. Specifically, for example, a pair of adjacent electrodes insulated from the other electrodes may be provided on any one of the surfaces of the piezo-electric member so that both of them are positioned in the same polarized area of the piezo-electric member.

We claim:

[1. A surface-wave driven motor comprising:

a moving member for being displaced;

a resilient member having a surface urged against said moving member;

a piezo-electric member provided in contact with said resilient member to impart vibration to said resilient member and create an elastic wave in said surface;

means having electrode means provided on said piezo-electric member and applying an AC voltage to said piezo-electric member through said electrode means;

means for detecting an electrical output produced in said piezo-electric member from an area on said piezo-electric member which is electrically insulated from said electrode means; and means for determining the frequency of said AC voltage on the basis of the detected electrical output.]

[2. A surface-wave driven motor according to claim 1, wherein said piezo-electric member is subjected to polarization treatment so that the polarity thereof is inverted at predetermined intervals in a direction in which said moving member is displaced.]

[3. A surface-wave driven motor according to claim 1, wherein said piezo-electric member is subjected to polarization treatment so that the polarity thereof is inverted at each length of about $\frac{1}{2}$ of a bending vibration wavelength created in said resilient member in a direction in which said moving member is displaced.]

4. A surface-wave driven motor [according to claim 1,] *comprising:*

*a moving member for being displaced;*

*a resilient member having a surface urged against said moving member;*

*a piezo-electric member provided in contact with said resilient member to impart vibration to said resilient member and create an elastic wave in said surface;*

*means having electrode means provided on said piezo-electric member and applying an AC voltage to said piezo-electric member through said electrode means;*

*means for detecting an electrical output produced in said piezo-electric member from an area on said piezo-electric member which is electrically insulated from said electrode means; and*

*means for determining the frequency of said AC voltage on the basis of the detected electrical output,* wherein said detecting means includes means for selecting an AC output which is within a predetermined frequency range created in said piezo-electric member.

[5. A surface-wave driven motor according to claim 1, wherein said detecting means detects an AC voltage produced in said piezo-electric member, and said determining means includes means for controlling the frequency of the AC voltage of said applying means at a frequency whereat the detected AC voltage becomes maximum.]

[6. A motor provided with a rotor rotated by a surface wave, comprising:

an annular resilient member disposed with its surface being in contact with said rotor;

an annular piezo-electric member provided in contact with said resilient member to impart bending vibration to said resilient member;

means having electrode means provided on said piezo-electric member and applying an AC voltage to said piezo-electric member through said electrode means;

means for detecting an electrical output produced in said piezo-electric member from an area on said piezo-electric member which electrically insulated from said electrode means; and means for detecting the frequency of said AC voltage on the basis of the detected electrical output.]

[7. A motor according to claim 6, wherein said piezo-electric member is subjected to polarization treatment so that the polarity thereof is inverted at predetermined intervals in the circumferential direction.]

[8. A motor according to claim 6, wherein said detecting means includes another electrode means electrically insulated from said electrode means of said applying means and provided on said piezo-electric member.]

[9. A motor according to claim 8, wherein said another electrode means is disposed at a position adjacent to the outer peripheral surface of the annulus of said piezo-electric member.]

[10. A motor according to claim 6, wherein said rotor, said resilient member and said piezo-electric member are coaxial with one another with respect to the axis of rotation of said rotor and axially contact one another.]

*11. A surface-wave driven motor comprising:*

*a moving member for being displaced;*

*a resilient member having a surface urged against said moving member;*

*a piezo-electric member provided in contact with said resilient member to impart vibration to said resilient member and create an elastic wave in said surface;*

*means having electrode means provided on said piezo-electric member and applying an AC voltage to said piezo-electric member through said electrode means;*

*means for detecting an electrical output produced in said piezo-electric member from an area on said piezo-electric member which is electrically insulated from said electrode means, said detecting means including an electrode on said area; and* means for determining the frequency of said AC voltage on the basis of the detected electrical output, said determining means including means for controlling the frequency of said AC voltage in response to said detected electrical output each time said electrical output varies throughout said applying of said AC voltage.

*12. A surface-wave driven motor according to claim 11, wherein said piezo-electric member is subjected to polarization treatment so that the polarity thereof is inverted at predetermined intervals in a direction in which said moving member is displaced.*

*13. A surface-wave driven motor according to claim 11, wherein said piezo-electric member is subjected to polarization treatment so that the polarity thereof is inverted at each length of about ½ of a bending vibration wavelength created in said resilient member in a direction in which said moving member is displaced.*

*14. A surface-wave driven motor according to claim 11, wherein said detecting means detects an AC voltage produced in said piezo-electric member, and said controlling means adjusts the frequency of the AC voltage of said applying means to a frequency whereat the detected AC voltage becomes maximum.*

*15. A surface-wave driven motor comprising:*

*a moving member for being displaced;*

*a resilient member having a surface urged against said moving member;*

*a piezo-electric member provided in contact with said resilient member to impart vibration to said resilient member and create an elastic wave in said surface;*

*means having electrode means provided on said piezo-electric member and applying an AC voltage to said piezo-electric member through said electrode means to drive said motor;*

*the efficiency of said motor being dependent upon the frequency of said AC voltage, and optimum frequency of said AC voltage for enhancement of said motor efficiency being variable with change in an extraneous condition such as the pressure between said moving member and said resilient member and the temperature of said motor;*

*means for detecting, during driving of said motor, an electrical output produced in said piezo-electric member from an area on said piezo-electric member which is electrically insulated from said electrode means; and*

*means for determining the frequency of said AC voltage on the basis of the detected electrical output, said determining means including means for controlling the frequency of said AC voltage in response to said electrical output each time said electrical output varies throughout the driving of said motor, and for adjusting the frequency of said AC voltage to provide an optimum frequency.*

*16. A surface-wave driven motor comprising;*

*a moving member for being displaced;*

*a resilient member having a surface urged against said moving member;*

*a piezo-electric member provided in contact with said resilient member to impart vibration to said resilient member and create an elastic wave in said surface;*

*means having electrode means provided on said piezo-electric member and applying an AC voltage to said piezo-electric member through said electrode means;*

*means for detecting an electrical output produced in said piezo-electric member from an area on said piezo-electric member which is electrically insulated from said electrode means;*

*means for determining the frequency of said AC voltage on the basis of the detected electrical output; and*

*filtering means provided between said detecting means and said determining means to pass therethrough a predetermined frequency band and to impede a frequency band other than said predetermined frequency band.*

*17. A surface-wave driven motor according to claim 16, wherein said electrical output includes two peak voltage values at two frequencies, respectively, of said AC voltage, only one of said peak values being a maximum peak value, and wherein said predetermined frequency band includes*

*said maximum peak value and excludes the other of said two peak values.*

*18. A surface-wave driven motor according to claim 16, wherein said determining means includes means for adjusting the frequency of the AC voltage of said applying means to a frequency whereat the detected electrical output passed through said filtering means becomes maximum.*

*19. A surface-wave driven motor according to claim 16, wherein said piezo-electric member is subjected to polarization treatment so that the polarity thereof is inverted at predetermined intervals in a direction in which said moving member is displaced.*

*20. A surface-wave driven motor according to claim 16, wherein said piezo-electric member is subjected to polarization treatment so that the polarity thereof is inverted at each length of about ½ of a bending vibration wavelength created in said resilient member in a direction in which said moving member is displaced.*

*21. A surface-wave driven motor comprising;*

*a moving member for being displaced;*

*a resilient member having a surface urged against said moving member;*

*a piezo-electric member provided in contact with said resilient member to impart vibration to said resilient member and create an elastic wave in said surface;*

*means having electrode means provided on said piezo-electric member and applying an AC voltage to said piezo-electric member through said electrode means;*

*means for detecting an electrical output produced in said piezo-electric member from an area on said piezo-electric member which is electrically insulated from said electrode means, said electrical output assuming a maximum peak value for a predetermined frequency of said AC voltage and assuming a small peak value for a frequency considerably distant from said predetermined frequency;*

*means for determining the frequency of said AC voltage on the basis of the detected electrical output; and*

*filtering means provided between said detecting means and said determining means to pass therethrough a predetermined frequency band including said predetermined frequency and to impede a frequency band including said distant frequency.*

*22. A surface-wave driven motor comprising;*

*a moving member for being displaced;*

*a resilient member having a surface urged against said moving member;*

*a piezo-electric member provided in contact with said resilient member to impart vibration to said resilient member and create an elastic wave in said surface;*

*means having electrode means provided on said piezo-electric member and applying an AC voltage to said piezo-electric member through said electrode means;*

*means for detecting an electrical output produced in said piezo-electric member from an area on said piezo-electric member which is electrically insulated from said electrode means, said detecting means including an electrode on said area;*

*means for determining the frequency of said AC voltage on the basis of the detected electrical output, said determining means including means for controlling the frequency of said AC voltage in response to said electrical output each time said electrical output varies throughout said applying of said AC voltage; and*

*filtering means provided between said detecting means and said determining means to pass therethrough a predetermined frequency band and to impede a frequency band other than said predetermined frequency band.*

*23. A surface-wave driven motor comprising;*

*a moving member for being displaced;*

*a resilient member having a surface urged against said moving member;*

*a piezo-electric member provided in contact with said resilient member to impart vibration to said resilient member and create an elastic wave in said surface;*

*means having electrode means provided on said piezo-electric member and applying an AC voltage to said piezo-electric member through said electrode means to drive said motor;*

*the efficiency of said motor being dependent upon the frequency of said AC voltage, an optimum frequency of said AC voltage for enhancement of said motor efficiency being variable with change in an extraneous condition such as the pressure between said moving member and said resilient member and the temperature of said motor;*

*means for detecting, during driving of said motor, an electrical output produced in said piezo-electric member from an area on said piezo-electric member which is electrically insulated from said electrode means, said electrical output assuming a maximum peak value for an optimum frequency of said AC voltage and assuming a small peak value for a frequency considerably distant from an optimum frequency;*

*means for determining the frequency of said AC voltage on the basis of the detected electrical output, said determining means including means for controlling the frequency of said AC voltage in response to said electrical output each time said optimum said electrical output varies throughout said driving of said motor, and for adjusting the frequency of said AC voltage to provide an optimum frequency; and*

*filtering means provided between said detecting means and said determining means to pass therethrough a predetermined frequency band including an optimum frequency and to impede a frequency band including said distant frequency.*

*24. A motor provided with a rotor rotated by a surface wave, comprising;*

*an annular resilient member disposed with its surface being in contact with said rotor;*

*an annular piezo-electric member in contact with said resilient member to impart bending vibration to said resilient member, said annular piezo-electric member comprising a ring having at one side thereof an inner peripheral area and an outer peripheral area that is positioned farther from the center of the ring than said inner peripheral area;*

*means having electrode means provided on said piezo-electric member and applying an AC voltage to said piezo-electric member through said electrode means;*

*means for detecting an electrical output produced in said piezo-electric member from an area on said piezo-electric member which is electrically insulated from said electrode means, said detecting means having an electrode provided at said outer peripheral area but not at said inner peripheral area; and*

*means for determining the frequency of said AC voltage on the basis of the detected electrical output.*

*25. A surface-wave driven motor according to claim 24, wherein said electrode means includes a portion at said inner peripheral area at a sector of said annular piezo-electric member that is common to said electrode of said detecting means.*

26. A motor provided with a rotor rotated by a surface wave, comprising:

an annular resilient member disposed with its surface being in contact with said rotor;

an annular piezo-electric member provided in contact with said resilient member to impart bending vibration to said resilient member, said piezo-electric member comprising a ring having a plurality of sections which are arranged in a circumferential direction of said ring and which include first and second sections spaced from each other and a third section positioned between said first and second sections, said third section having a length of about ¼ of a wavelength of said bending vibration in the circumferential direction;

means having electrode means provided on said first and second sections of said piezo-electric member and applying an AC voltage to said piezo-electric member through said electrode means;

means for detecting an electrical output produced in said piezo-electric member from an area on said piezo-electric member which is electrically insulated from said electrode means, said area including said third section of said piezo-electric member and having an electrode on said third section for detecting an electrical output produced in said third section; and means for determining the frequency of said AC voltage on the basis of the detected electrical output.

27. A motor according to claim 26, wherein said third section lies between first ends of said first and second sections, and wherein said plurality of sections of said piezo-electric member further includes a fourth section lying between second ends of said first and second sections and having a length of about ¾ of a wavelength of said bending vibration in the circumferential direction.

28. A motor according to claim 26, wherein said determining means includes means for controlling the frequency of said AC voltage in response to said electrical output detected by said detecting means each time said electrical output varies throughout said applying of said AC voltage.

29. A surface-wave driven motor comprising;

a moving member for being displaced;

a resilient member having a surface urged against said moving member;

a piezo-electric member provided in contact with said resilient member to impart vibration to said resilient member and create an elastic vibration wave in said surface that is propagated along said surface;

means having electrode means provided on said piezo-electric member and applying an AC voltage to said piezo-electric member through said electrode means;

means for detecting an electrical output produced in said piezo-electric member from an area on said piezo-electric member which is electrically insulated from said electrode means; and means for determining the frequency of said AC voltage on the basis of the detected electrical output;

wherein said means having electrode means includes first, second, and third electrodes electrically insulated from each other and provided on one side of said piezo-electric member, and a fourth electrode provided on the opposite side of said piezo-electric member between said piezo-electric member and said resilient member, electrically conductive paste means extending from said third electrode to said fourth electrode over a periphery of said piezo-electric member in order to electrically connect said fourth electrode to said third electrode, and means for applying first and second AC voltages which are out of phase with each other between said first and third electrodes, and between said second and third electrodes, respectively.

30. A surface-wave driven motor according to claim 29, wherein said means having electrode means further comprises first, second, and third terminals on said first, second, and third electrodes, respectively, and wherein said first and second AC voltages are applied between said first terminal and said third terminal, and between said second terminal and said third terminal, respectively.

31. A surface-wave driven motor according to claim 29, wherein said resilient member and said piezo-electric member are annular and said third electrode has a length of ¾ wavelength of said vibration wave in a circumferential direction of said piezo-electric member.

32. A surface-wave driven motor according to claim 2, wherein said piezo-electric member is ring-shaped and said electrically conductive paste means is coated on an outer periphery of said piezo-electric member.

33. A surface-wave driven motor comprising:

a moving member for being displaced;

a resilient member having a surface urged against said moving member;

a piezo-electric member provided in contact with said resilient member to impart vibration to said resilient member and create an elastic vibration wave in said surface that is propagated along said surface;

means having electrode means provided on said piezo-electric member and applying an AC voltage to said piezo-electric member through said electrode means;

means for detecting an electrical output produced in said piezo-electric member from an area on said piezo-electric member which is electrically insulated from said electrode means; and means for determining the frequency of said AC voltage on the basis of the detected electrical output;

wherein said means having electrode means includes first and second groups of electrodes provided on one side of said piezo-electric member, and an electrode member provided on the opposite side of said piezo-electric member between said piezo-electric member and said resilient member, each of said electrodes has a length of ½ wavelength of said vibration wave and said electrode member as a length longer than said each electrode, and means for applying first and second AC voltages which are out of phase with each other between said first group of electrodes and said electrode member and between said second group of electrodes and said electrode member, respectively.

34. A surface-wave driven motor according to claim 33, wherein said resilient member, said piezo-electric member, and said electrode member are annular.

35. A surface-wave driven motor comprising:

a moving member for being displaced;

a resilient member having a surface urged against said moving member;

a piezo-electric member provided in contact with said resilient member to impart vibration to said resilient member and create an elastic vibration wave in said surface that is propagated along said surface;

means having electrode means provided on said piezo-electric member and applying an AC voltage to said piezo-electric member through said electrode means;

means for detecting an electrical output produced in said piezo-electric member from an area on said piezo-electric member which is electrically insulated from said electrode means; and means for determining the frequency of said AC voltage on the basis of the detected electrical output;

*wherein said means having electrode means includes first and second electrode members each of which has a plurality of electrodes provided on one side of said piezo-electric member, a third electrode member provided on the opposite side of said piezo-electric member between said piezo-electric member and said resilient member, electrically conductive paste means for electrically connecting said plurality of electrodes of said first electrode member with one another and electrically connecting said plurality of electrodes of said second electrode member with one another, and means for applying first and second AC voltages which are out of phase with each other between said first electrode member and said third electrode member and between said second electrode member and said third electrode member, respectively.*

*36. A surface-wave driven motor according to claim 35, wherein said detecting means includes a fourth electrode member provided on said one side of said piezo-electric member between said first and second electrode members.*

* * * * *